United States Patent [19]

Wright

[11] Patent Number: 4,886,040

[45] Date of Patent: Dec. 12, 1989

[54] METHOD AND APPARATUS FOR REMOVING CONCRETE COATING FROM A PIPE

[75] Inventor: Nigel Wright, Northumberland, England

[73] Assignee: British Gas PLC, London, England

[21] Appl. No.: 114,191

[22] Filed: Oct. 29, 1987

[30] Foreign Application Priority Data

Nov. 27, 1986 [GB] United Kingdom ................. 8628386

[51] Int. Cl.[4] .............................................. B23D 1/32

[52] U.S. Cl. .............................................. 125/23 R

[58] Field of Search ...................... 125/13 R, 14, 23 R, 125/23 J; 82/4 C; 30/90.7, 92.5, 97

[56] References Cited

U.S. PATENT DOCUMENTS

| | | | |
|---|---|---|---|
| 3,727,599 | 4/1973 | Sugiki et al. | 125/23 R |
| 3,933,519 | 6/1976 | Koch et al. | 30/97 |
| 4,044,749 | 8/1977 | Bowen et al. | 125/23 R |
| 4,127,937 | 12/1978 | Harless et al. | 30/90.7 |
| 4,359,820 | 11/1982 | Wheeler et al. | 30/97 |
| 4,484,559 | 11/1984 | Ledford et al. | 125/23 R |
| 4,522,054 | 6/1985 | Wilson et al. | 72/392 |

*Primary Examiner*—Frederick R. Schmidt
*Assistant Examiner*—Blynn Shideler
*Attorney, Agent, or Firm*—Larson and Taylor

[57] ABSTRACT

Concrete weight 14 coating on a subsea pipe has slots 82, 84 made in it by means of a circular saw carried by a first apparatus mounted on the pipe. The saw also cuts two spaced circumferential slots. All slots sever all steel reinforcement. The slots have boundary surfaces defining two semi-cylindrical pieces of concrete 15, 17. A second apparatus replaces the first.

It has a frame 90 clamped by chains to the pipe outside the pieces 15, 17. Two assemblies 98 adjustably spaced apart along the frame include plates 100 which are forced apart by clyinders 102. The plates 100 are guided downwards by cam tracks 116 and rollers 118 as the plates 120 swing down about pins 126. The plates 100 continue to exert thrust on the boundary surfaces of the slot 84 as the two pieces 15, 17 separate. The thrust on either piece of coating is at least partly reacted against the other so reducing the turning moment on the frame 90.

1 Claim, 6 Drawing Sheets

METHOD AND APPARATUS FOR REMOVING CONCRETE COATING FROM A PIPE

The invention relates to a method and apparatus for removing concrete coating from a pipe.

It has been proposed in U.S. Pat. specification No. 3933519 to remove concrete coating from a pipe by means of a high-pressure seawater jet issuing from a nozzle which is moveable on a carriage along a frame arranged for rotation about the pipe. The carriage also carries a blade to cut reinforcing wire.

It has been proposed in U.S. Pat. specification No. 4044749 to remove concrete by breaking it into large pieces using bits spaced around the pipe on a moveable frame. The bits are forced against the concrete by hydraulic cylinders and are carried by a frame angularly reciprocable about the pipe. After the bits have angularly traversed one section of pipe to break the coating, the frame is re-positioned lengthwise of the pipe.

It has been proposed in U.S. Pat. specification No. 4484559 to cut a concrete coating using eight cutter blades angularly distributed about the pipe and carried by a carriage moveable along the pipe on a frame secured to the pipe. The blades are forced into the concrete by respective hydraulic cylinders and may need to make two or more passes cutting progressively deeper.

After the cutting stage, hand tools, wielded for example by divers, are used to remove cut segments of coating.

In those proposals concrete coating is proposed to be removed progressively by the cutting or breaking action of a water jet, bits, or by hand tools following a preliminary cutting action.

The object of the invention is to remove concrete coating in two pieces in a single operation from part of a pipe after cutting has defined the boundary surfaces of the coating of that part.

A method of removing in pieces all of the concrete coating from a length of pipe, according to the invention, which coating has slots defining the boundary surfaces of the pieces comprises in the case of each piece separating the piece from the pipe by applying thrust against a boundary surface of the piece.

Preferably, in the case of each piece any thrust applied against a boundary surface thereof, not reacted on an adjacent piece is reacted on the coating outside the boundaries of all of the pieces making up the coating on said length of pipe.

Preferably all of the concrete is removed from said length in two pieces the respective thrusts against which are applied against boundary surfaces which are mutually opposed at a slot between the two pieces.

Preferably the thrust applied to the boundary of either piece is at least partly reacted against the boundary of the other piece, at least while both pieces adhere to the pipe.

Apparatus operable to perform the method according to the invention comprises a frame, first means for securing the frame to the pipe engageable with the coating outside the boundaries of the pieces and second means operable to separate the pieces of coating and comprising abutments insertable in the slot between the opposed boundary surfaces and hydraulic cylinder means operable to separate the abutments to apply thrusts against the opposed boundary surfaces.

One way of carrying out the method and one form of apparatus for performing the method will now be described by way of example with reference to the accompanying drawings, in which.

Figure 1:
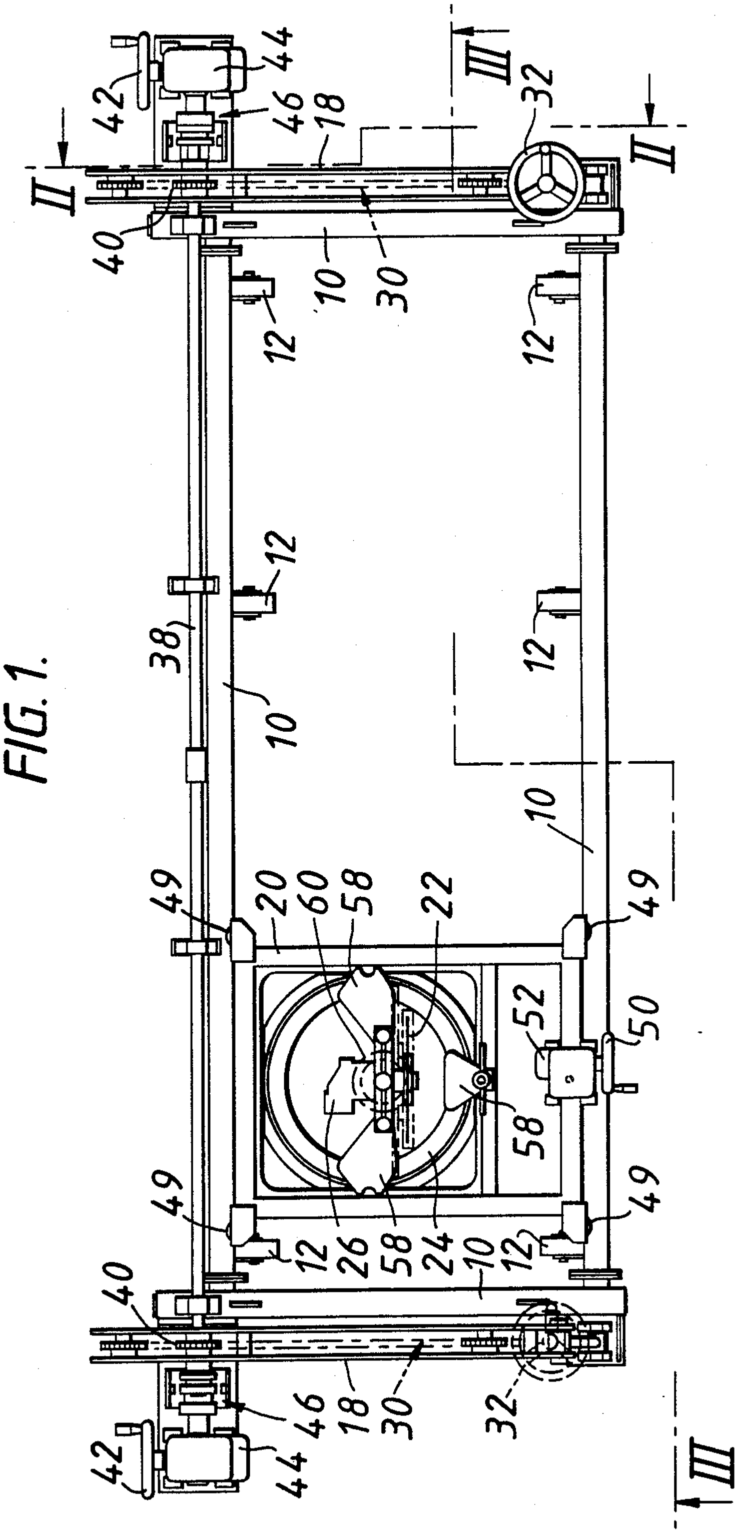
FIG. 1 is a plan of cutting apparatus.
Figure 2:
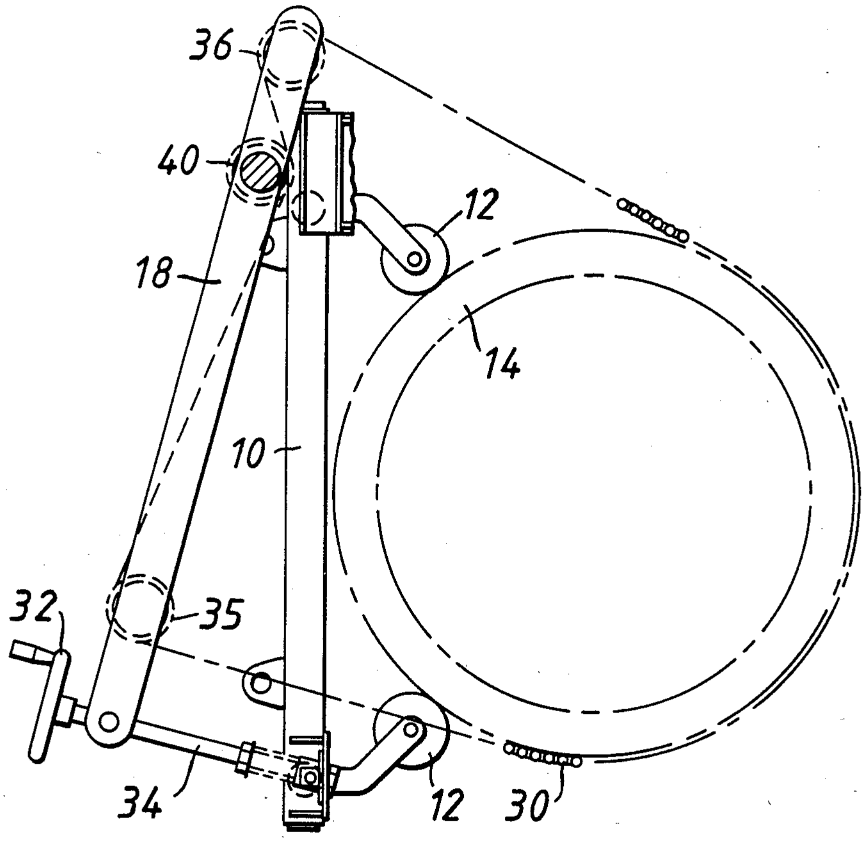
FIGS. 2 and 3 are, respectively, vertical sections at II-II and III-III in FIG. 1.
Figure 3:
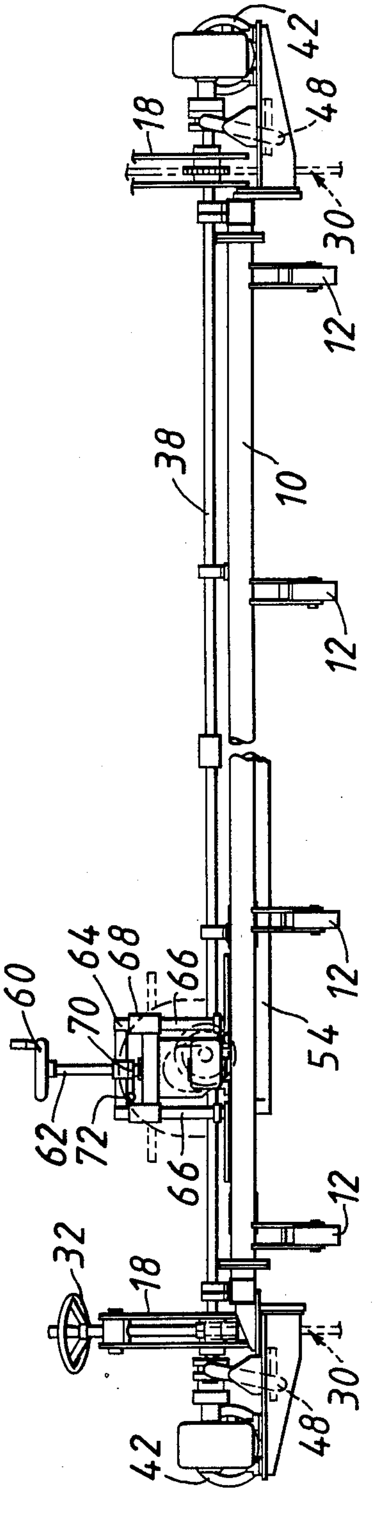

The two apparatuses shown in the drawings are used in turn typically for removing concrete weight coating from an oil or gas pipeline, which is installed on the seabed, to enable repair of a damaged area of pipe to be effected. The apparatus shown in FIGS. 1 to 3 is used to cut in the coating two spaced, circumferential slots, two closely-spaced, longitudinal slots at the twelve o'clock position on the pipe and one longitudinal slot at the six o'clock position. After the web of concrete between the two twelve o'clock slots has been removed manually to produce a single, wider slot, the first apparatus is removed and the second apparatus is used to force the two semi-cylindrical, panel-like pieces of coating 15, 17 (FIG. 6) off the pipe. The slots do not extend right through the coating to the outer surface of the pipe, but the cutting action is deep enough to ensure that all steel reinforcement is completely severed at the slots. The second apparatus fractures the ligaments of concrete between the slots and the pipe wall. The pipe is treated with a layer of material before the concrete coating is applied which material ensures very good adhesion of the coating to the pipe but the second apparatus overcomes the adhesion of the coating to the pipe wall.

The apparatus shown in FIGS. 1 to 3 consists of the following main components: a rectangular frame 10 having wheels 12 engageable with the outer surface of a concrete weight-coating 14 surrounding a pipeline 16 (FIGS. 2 and 4 to 6); two arms 18 pivotally mounted on the frame 10 adjacent the frame ends; a carriage 20 which runs along the frame 10; and a diamond-tipped circular saw 22 mounted on a slew-ring assembly 24 carried by the carriage 20 and driven by a hydraulic motor 26. Before the apparatus is used the seabed is excavated to give one meter's clearance beneath the pipeline in the zone of repair.

The apparatus also includes two endless roller-type chains 30 which hold the apparatus on the pipeline (FIG. 2). The chains 30 are tensioned by angular adjustment of the arms 18 effected by turning handwheels 32 secured to screws 34 which engage respective nuts carried by the arms 18. The arms 18 each carry idler sprockets 35, 36 around which the chain 30 passes in each case. The arms 18 turn about a shaft 38 running the length of the frame 10 and carrying two drive sprockets 40 engaging the chains 30. The shaft 38 can be driven manually from either end of the frame 10 (to move the apparatus around the pipeline) by a respective handwheel 42 and worm-gear 44. Each worm-gear 44 has an output shaft connected to one part of a disengageable two-part dog-clutch 46. The clutches 46 are operable by respective handles 48 (FIG. 3).

The carriage 20 is supported by rollers 49 running on the frame 10 and is moveable by rotation of a handwheel 50 which drives a pinion through a worm-gear 52. The pinion meshes with a rack 54 (FIG. 3) running beneath a longitudinal member of the frame 10. The slew-ring assembly 24 can be locked in any of three positions by a lock at 56 engageable with any of three lock brackets 58.

The saw 22 can be moved towards or away from the pipe coating 14 by a handwheel 60 secured to a screw 62 working through a nut on a 64 carried on two posts 66 by the slewing-ring assembly 24. A bracket 68 carrying the saw 22 and its motor 26 slides on the posts 66. The depth of cut is limited by a stop 70 on the screw 62, releasably lockable by a handle 72.

The apparatus has buoyancy aid (not shown) to assist a diver during circumferential cutting which is achieved by operation of the handwheels 42 to move the apparatus around the pipe. The saw 22 is set at right-angles to the position shown in FIG. 1 during circumferential cutting. Two circumferential slots spaced apart 2000 millimeters for example are cut. The two slots are shown at 80 in FIG. 4. With the saw 22 positioned as shown in FIG. 1 two longitudinal slots close together (for example 40 mm apart) are cut at the twelve o'clock position on the coating and one longitudinal slot is cut at the six o'clock position as at 82 in FIG. 6. The carriage 20 is moved along the pipe by operation of the handwheel 50 during these operations.

The 40 mm web of concrete coating between the twelve o'clock slots is removed by the diver using a chipping hammer powered from the same powerpack as the apparatus. A 40 mm wide slot at twelve o'clock is thus formed, as shown at 84 in FIG. 6. The chisel bit of the hammer is fitted with a pivoted slipper guide to restrict the depth of cut and preclude damage to the pipe wall. The chipping operation typically requires some five minutes or less. Each longitudinal slot requires an average of ten minutes and each circumferential cut an average of sixty minutes. The slots are cut deep enough to ensure that all steel reinforcement bars in the coating are completely severed at the slots.

When the cutting operations are completed the first piece of apparatus is removed from the pipe.

Figure 4:
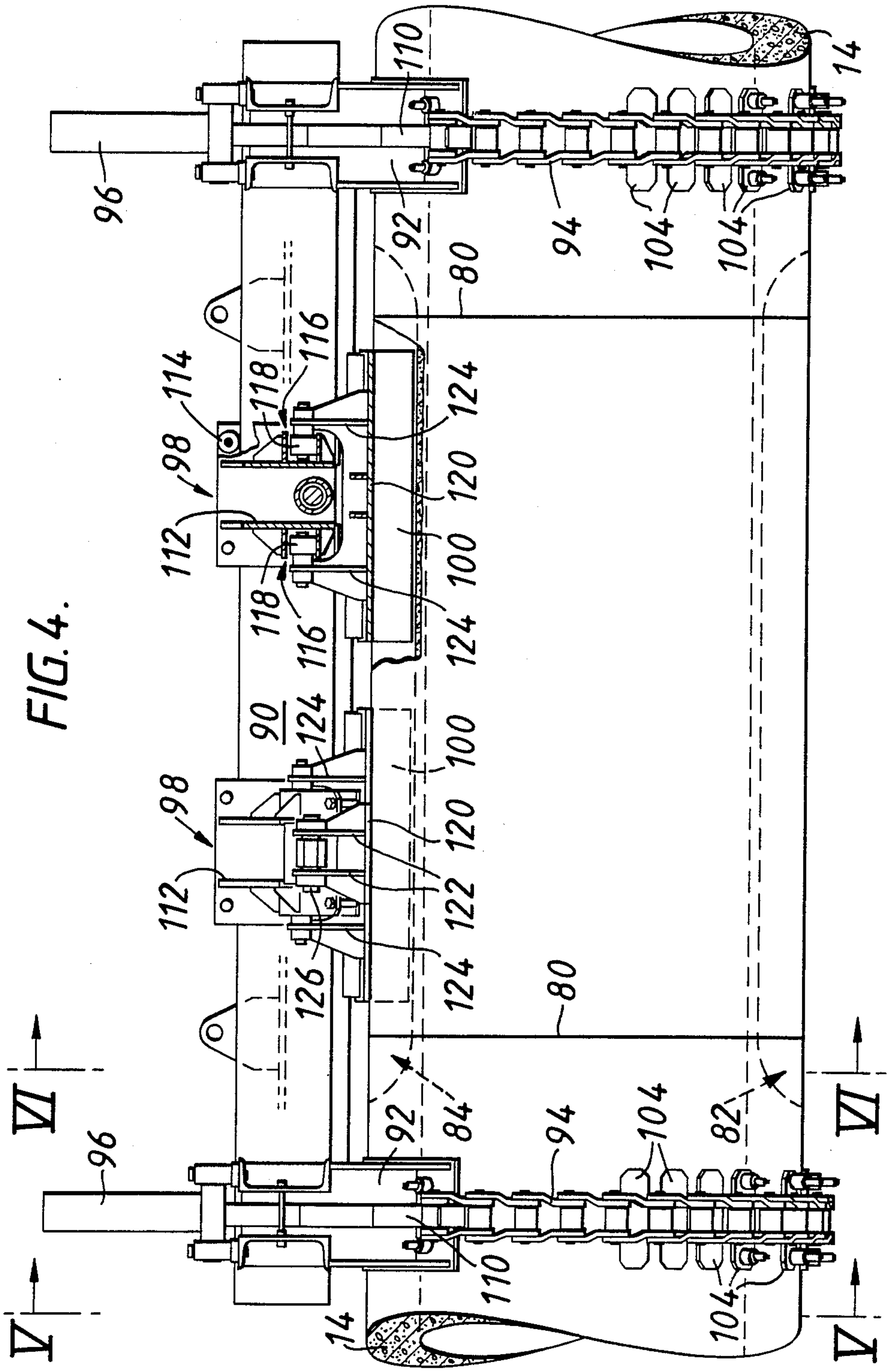
FIG. 4 is a side elevation showing part of a pipe and concrete coating removal apparatus mounted on the pipe in position to remove coating which has already been cut.
Figure 5:
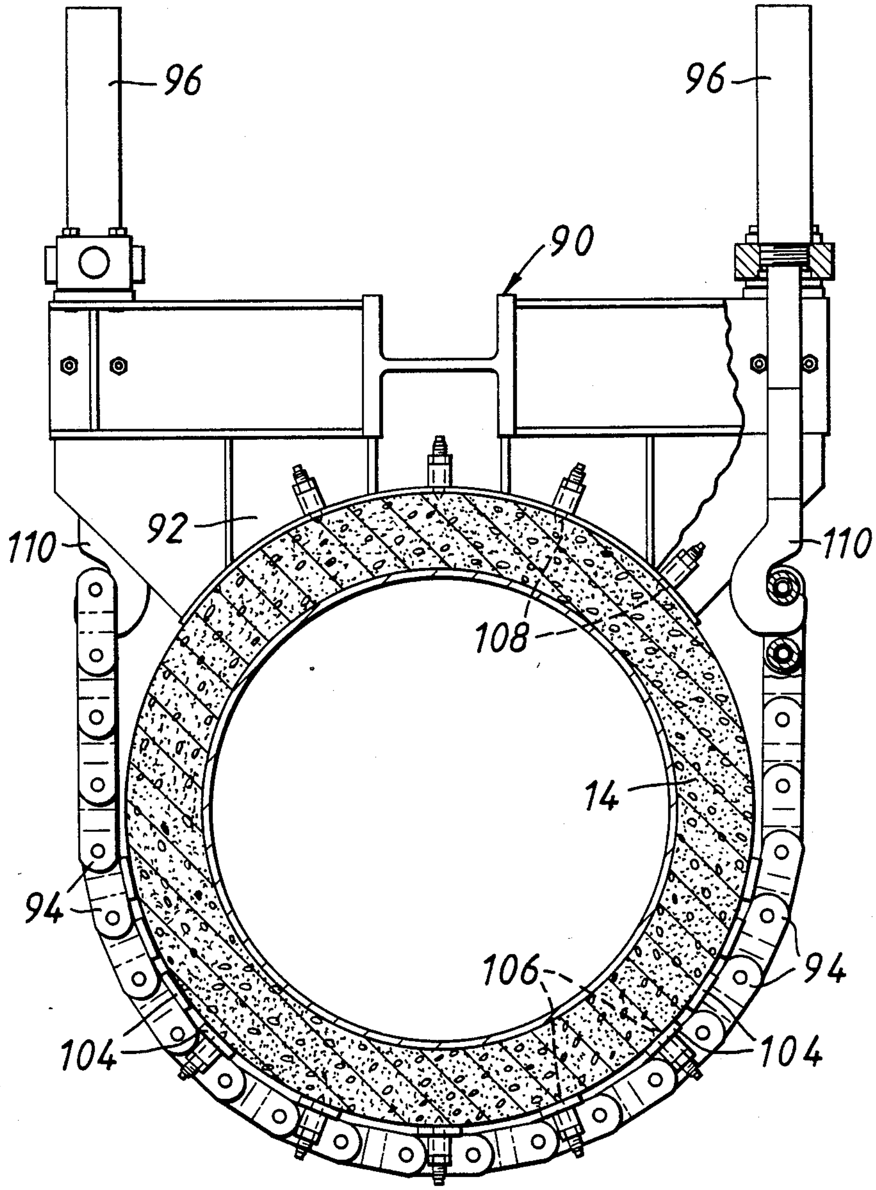
FIGS. 5 and 6 are, respectively, vertical sections at V-V and VI-VI in FIG. 4.
Figure 6:
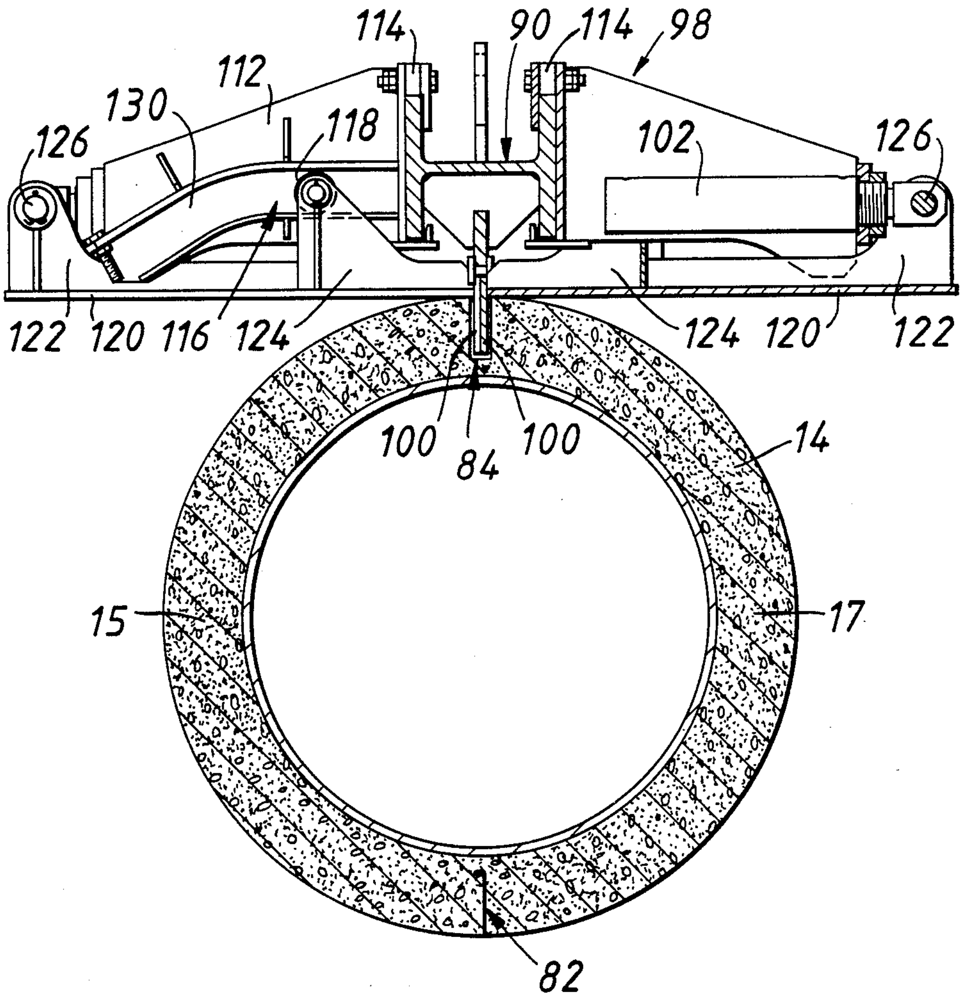

The slots 80, 82 and 84 define the boundary surfaces of the two semi-cylindrical, panel-shaped pieces of coating 15, 17 (FIG. 6) which are forced off the pipe using the second apparatus shown in FIGS. 4 to 6.

The apparatus shown in FIGS. 4 to 6 consists of the following main components: a very strong and stiff frame 90 having two saddles 92 which engage the upper surface of the coating 14; two roller-type chains 94, which pass beneath the pipe and engage the lower surface of the coating 14; four hydraulic cylinders 96 carried by the frame 90 and operable to tighten the chains 94; and two assemblies 98 each including two abutments in the form of plates 100, which are received in the slot 84 and are separable by hydraulic cylinders 102.

Each chain 94 carries plates 104 each of which has a pointed projection 106 adjacent each end. The projections 106 are directed towards the coating 14 and when the chains 94 are tightened the projections 106 penetrate the coating as shown in FIG. 5. Similar pointed projections 108 are provided at the inner faces of the saddles 92 and penetrate the coating 14 when the chains 94 are tightened. The chains 94 and the penetration of the coating 14 by the projections 106, 108 ensure that the frame 98 is held to the pipe sufficiently strongly to prevent the frame 98 from being forced to rotate around the pipe by the reaction forces caused by operation of the cylinders 102, as explained below.

The ends of each chain 94 are connected to the piston rods of the corresponding pair of cylinders 96 by hooks 110.

Each assembly 98 includes a very strong and stiff chassis 112 accommodating the two corresponding cylinders 102. The chassis 112 has a central opening which receives the longitudinal member of the main frame 90 of the apparatus. The chassis 112 has rollers 114 running on the upper edges of the frame 90 so that the position of the assembly 98 is readily ajustable along the frame 90.

Each chassis 112 has two pairs of cam-tracks 112. In each pair of cam-tracks 116 a track at each side of the chassis receives a respective cam-follower in the form of a roller 118 of a pair of rollers carried by a plate assembly which includes the respective plate 100. Each plate assembly comprises a main plate 120, welded at one end to the plate 100, and welded to first and second upstanding pairs of bracket plates 122 and 124, respectively. The bracket plates 122 carry a pivot pin 126 connected to the piston rod of the corresponding hydraulic cyulinder 102. The bracket plates 124 each carry in cantilever fashion a respective one of the rollers 118.

The apparatus as shown in FIGS. 4 to 6 is ready for operation to force the two panel-shaped pieces of coating off the pipe. The cylinders 102 are supplied with hydraulic fluid under pressure from a common power pack (not shown). The power pack includes a four-way split-flow arrangement which ensures equal travels for the pistons of the cylinders. As the cylinders operate their piston rods extend to force the plates 100 apart in each pair, thus forcing the concrete panel-shaped pieces off the pipe. The ligaments of concrete between the slots 82, 84 and the pipe wall are split as this action occurs. As the pieces separate, their upper boundary surfaces defined by the opposite, longitudinal walls of the slot 84 move in downwardly inclined paths. Accordingly, the plates 100 also travel downwardly to maintain their engagement with those boundary surfaces as the rollers 118 move along the downwardly inclined outer portions 130 of the cam-tracks 116. Also, the plates 120 swing downwardly about the pins 1216 at the ends of the extending piston rods of the cylinders 102. The two pieces of coating 15, 17 fall away from the pipe. During the initial build-up of the thrusts exerted upon the boundary surfaces of the two pieces by the plates 100 the thrust in each case on one surface is effectively reacted against the other boundary surface, thus at least minimising if not eliminating the resultant turning moment on the frame 90 about the pipe. As the pieces move away from the pipe some turning moment on the frame 90 will generally result because one piece will probably adhere more strongly to the pipe than the other.

In any case, the frame 90 is strong enough to sustain the maximum moment which can result from the action of the cylinders 102. For example, each cylinder exerts a force of some 290 kilonewtons (almost 30 tons) through a stroke of 368 mm (14.4 inches). Typically, the clamping cylinders 96 each exert some 348 kilonewtons (almost 36 tons) through a stroke of 350 mm. Accordingly if either piece separates completely from the pipe before the other piece has begun to separate the force necessary to push that other piece off the pipe can be fully reacted against the pipe through the chains.

The clamping cylinders are supplied from a separate powerpack. The two powerpacks each supply fluid at 700 bar maximum. The chains 94 can each sustain tension of 768 kilonewtons (80 tons). On average the time required to force the pieces of coating off the pipe is some five Although it is preferred to remove the concrete coating from the length of pipe in only two pieces as described with reference to the drawings, modifications of the method and apparatus can enable the coating to be removed in a different number of pieces, for example three or four pieces, or some other number.

I claim:

1. Apparatus adapted to remove a concrete coating from a length of pipe having two straight diametrically opposed slots which join two spaced circumferential slots thereby dividing the coating to be removed into two semi-cylindrical pieces of coating; the apparatus comprising a frame member, clamping means on said frame member to attach the frame to the pipe at a position along the pipe which is spaced from the position of the semi-cylindrical pieces, two assemblies adjustably spaced along said frame; each said assembly comprising abutment plates adapted to engage with at least one of said diametrically opposed slots, hydraulic cylinder means adapted to force said abutment members apart, guiding means for guiding said abutment means, and pivot means.

* * * * *